(12) United States Patent
Nissler et al.

(10) Patent No.: US 9,616,575 B2
(45) Date of Patent: Apr. 11, 2017

(54) DEVICE FOR REMOVING PLATE-SHAPED ELEMENTS WITH FOURTH LEVER

(71) Applicant: Robert Bosch GmbH, Stuttgart (DE)

(72) Inventors: Ulrich Nissler, Weinstadt (DE); Bernhard Vaihinger, Weinstadt (DE); Michael Sipple, Gschwend (DE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 14/759,439

(22) PCT Filed: Nov. 27, 2013

(86) PCT No.: PCT/EP2013/074814
§ 371 (c)(1),
(2) Date: Jul. 7, 2015

(87) PCT Pub. No.: WO2014/108243
PCT Pub. Date: Jul. 17, 2014

(65) Prior Publication Data
US 2015/0352723 A1    Dec. 10, 2015

(30) Foreign Application Priority Data
Jan. 8, 2013 (DE) .................. 10 2013 200 146

(51) Int. Cl.
*B65H 5/00* (2006.01)
*B25J 11/00* (2006.01)
(Continued)

(52) U.S. Cl.
CPC ............... *B25J 11/00* (2013.01); *B65G 47/90* (2013.01); *B65G 47/915* (2013.01);
(Continued)

(58) Field of Classification Search
CPC ..... B25J 15/0616; B25J 9/126; B65G 47/915; B65G 47/918; B65G 47/962; B65H 5/10; B65H 5/14
(Continued)

(56) References Cited

U.S. PATENT DOCUMENTS 3,053,529 A * 9/1962 Dunn ...................... B65H 3/38
271/11
3,902,606 A * 9/1975 Ronbeck .............. B65G 47/904
414/733

(Continued)

FOREIGN PATENT DOCUMENTS

EP    1394049    3/2004
EP    2492224    8/2012
(Continued)

OTHER PUBLICATIONS

International Search Report for Application No. PCT/EP2013/074814 dated Mar. 18, 2014 (English Translation, 3 pages).

*Primary Examiner* — Gerald McClain
(74) *Attorney, Agent, or Firm* — Michael Best & Friedrich LLP

(57) ABSTRACT

The present invention relates to a device (1) for removing plate-shaped elements (2), in particular cardboard blanks, comprising a carrier device (16), a holding device (9) which is arranged on the carrier device (16) for holding the plate-shaped element (2), a drive (7) with a driven shaft (8), a first lever (11) which is arranged fixedly on the shaft (8) so as to rotate with it, a second lever (12) which is connected rotatably to the first lever (11) and rotatably to the carrier device (16), a fourth lever (14) which is arranged such that it can be rotated about a fixed point (18), wherein the fourth lever (14) is connected rotatably to the carrier device (16),
(Continued)

and a third lever (13) which is connected rotatably to the first lever (11) and rotatably to the fourth lever (14).

12 Claims, 4 Drawing Sheets

(51) Int. Cl.
  *B65G 47/90* (2006.01)
  *B65H 3/00* (2006.01)
  *B65G 47/96* (2006.01)
  *B65H 3/08* (2006.01)
  *B65H 5/10* (2006.01)
  *B65H 5/14* (2006.01)
  *B25J 15/06* (2006.01)
  *B65G 47/91* (2006.01)

(52) U.S. Cl.
  CPC ............ *B65G 47/962* (2013.01); *B65H 3/00* (2013.01); *B65H 3/0883* (2013.01); *B65H 5/10* (2013.01); *B25J 15/0616* (2013.01); *B65G 47/918* (2013.01); *B65G 2201/022* (2013.01); *B65H 5/14* (2013.01); *B65H 2301/33214* (2013.01); *B65H 2403/531* (2013.01); *B65H 2406/34* (2013.01); *B65H 2701/176* (2013.01)

(58) Field of Classification Search
  USPC ................. 493/71; 271/129, 132, 99, 11, 12
  See application file for complete search history.

(56) References Cited

U.S. PATENT DOCUMENTS

| | | | | |
|---|---|---|---|---|
| 4,093,083 A * | 6/1978 | Klaus | .................. | B65G 49/068 |
| | | | | 414/798.5 |
| 4,114,769 A * | 9/1978 | Cuniberti | ............. | B65G 47/914 |
| | | | | 414/816 |
| 4,494,537 A * | 1/1985 | Gottlieb | ............. | B63C 11/2227 |
| | | | | 128/201.28 |
| 5,094,495 A * | 3/1992 | Littell | ................... | B66C 1/0212 |
| | | | | 414/917 |
| 5,158,423 A * | 10/1992 | Liljengren | ............... | B25J 9/023 |
| | | | | 414/917 |
| 5,676,519 A * | 10/1997 | Canziani | ............. | B65G 47/915 |
| | | | | 414/737 |
| 6,666,323 B2 * | 12/2003 | | | Benmayor |
| | | Vivas | ................. | H05K 13/0069 |
| | | | | 414/737 |
| 2001/0023227 A1 | 9/2001 | Gambetti | | |

FOREIGN PATENT DOCUMENTS

| | | |
|---|---|---|
| WO | 2006059192 | 6/2006 |
| WO | 2011015610 | 2/2011 |

* cited by examiner

DEVICE FOR REMOVING PLATE-SHAPED ELEMENTS WITH FOURTH LEVER

BACKGROUND OF THE INVENTION

The present invention relates to a device for removing plate-shaped elements. The device is particularly used to remove blanks of solid fiber board or corrugated cardboard. In so doing, the plate-shaped elements are removed from a magazine and set aside for further processing.

US 2001/0023227 A1 represents a previously known device for removing cardboard blanks. The blanks are thereby received out of the vertical position, lifted upwards and in the process rotated into a horizontal position. The previously known arrangement has a complex construction.

SUMMARY OF THE INVENTION

The device according to the invention facilitates a removal of plate-shaped elements, in particular cardboard blanks, wherein the device requires only one drive and is therefore simple to produce and can be operated with low maintenance. The device according to the invention enables vertically arranged, plate-shaped elements to be received and to be laid down in a horizontal position. The plate-shaped elements can thereby be laid down at a level which is higher than a lower edge of said plate-shaped elements upon being received. By means of the inventive arrangement of the different levers, the entire movement sequence can be implemented with only one drive. The removal of the plate-shaped elements and their rotation into the horizontal position takes place without touching the plate-shaped elements still situated in the magazine. An ergonomically favorable position for further processing the plate-shaped elements occurs as a result of the relatively high stacking position. All of these advantages are achieved by the inventive device for removing plate-shaped elements, comprising a carrier device and a holding device which is arranged on the carrier device for holding the plate-shaped element. In addition, a drive with a driven shaft is provided. A first lever is arranged fixedly on the driven shaft so as to rotate with it. A second lever is connected rotatably to the first lever and the carrier device. A fourth lever is arranged such that it can be rotated about a fixed point. The fourth lever is connected rotatably to the carrier device. Furthermore, a third lever is provided. The third lever is connected rotatably to the first lever and rotatably to the fourth lever. The levers can be set into motion only by means of the rotation of the driven shaft. By means of the arrangement of the levers according to the invention, the carrier device together with the holding device moves out of the vertical position into the horizontal position. As a result, the plate-shaped element which has been received in the device is lifted such that the lower edge of said plate-shaped element is higher in the end position thereof than in the initial position thereof. The device according to the invention is particularly used to remove cardboard blanks from a magazine.

Provision is preferably made for the holding device to comprise a gripper and/or at least a suction apparatus. The plate-shaped element can be fixed to the holding device using the gripper or suction apparatus.

The rotatable connections between the individual elements are denoted as "connecting points". The second lever is connected to the first lever at a first connecting point. The third lever is connected to the first lever at a second connecting point. Provision is preferably made for the shaft to be arranged between the first and second connecting point. In so doing, the first connecting point is, for example, lowered and the second connecting point is simultaneously raised during a rotation of the shaft.

Provision is furthermore made for the third lever to be connected to the fourth lever at a third connecting point. The carrier device is connected to the fourth lever at a fourth connecting point. The fixed point is disposed between the third and the fourth connecting point.

The arrangement of an element between two connecting points does not mean that said element, for example the shaft or the fixed point, has to lie exactly on a line between the two connecting points. Ultimately it is sufficient if an angle between an imaginary line from the shaft to the first connecting point and an imaginary line from the shaft to the second connecting point is greater than 90°. Provision is likewise preferably made for the angle between an imaginary line from the third connecting point to the fixed point and an imaginary line from the fourth connecting point to the fixed point to be greater than 90°.

In a preferred variant to the invention, a fifth lever is provided. The fifth lever is connected rotatably to the third lever and rotatably to the holding device. The holding device is thereby guided in a linearly movable manner on the carrier device. By means of the fifth lever, the holding device is moved linearly with respect to the carrier device; thus enabling the plate-shaped element to be lifted. Provision is thereby preferably made for the fifth lever to be connected to the third lever between the second and third connecting point.

As an alternative to the use of the fifth lever, it is also possible for the holding device to be fixedly connected to the carrier device. In so doing, the construction is simplified. In this variant to the invention, it should be noted that the plate-shaped element is not lifted as far as when using the fifth lever.

The rotational axes of the shaft and of all of the levers used are preferably aligned parallel to one another, and preferably aligned horizontally.

The fixed point is particularly fixed with respect to the driven shaft.

The entire device is preferably mounted on a base. The drive is preferably integrated into the base.

In addition, provision is preferably made for the levers of the device to be designed to remove the plate-shaped element from a first position (also: initial position or magazine) and to lay said element down in a second position, wherein the plate-shaped element stands vertically in the first position and wherein said plate-shaped element lies horizontally in the second position. The vertical and horizontal position are in each case to be provided with a deviation of up to ±20°. The plate-shaped elements are preferably inclined at an angle of 10°±5° towards the device in the first position. The position of the plate-shaped element, in particular the position of the lower edge, is higher in the second position than the position of the lower edge of said plate-shaped element in the first position.

BRIEF DESCRIPTION OF THE DRAWINGS

An exemplary embodiment of the invention is described below in detail with reference to the accompanying drawings. In the drawings.

DETAILED DESCRIPTION

A device 1 for removing plate-shaped elements 2, designed as cardboard blanks, is described below with the aid of FIGS. 1 to 4.

Figure 1:
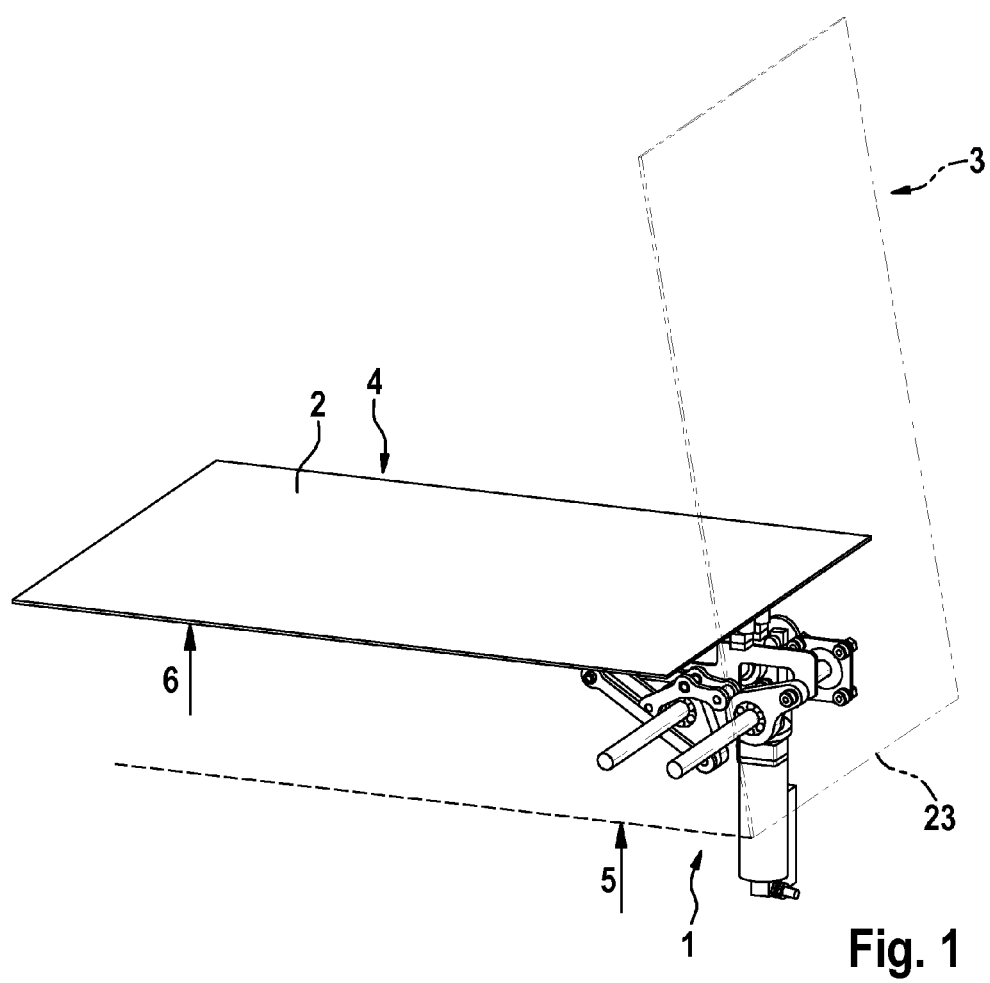
FIG. 1 shows an isometric view of a device according to the invention with a plate-shaped element according to an exemplary embodiment.

FIG. 1 shows a device 1 with the plate-shaped element 2. The plate-shaped element 2 is initially located in a first position 3, for example in a magazine. The plate-shaped elements are arranged approximately vertically in the first position 3. The device 1 removes the plate-shaped elements 2 individually from the first position 3 and conveys them to a second position 4. In the process, said plate-shaped elements 2 are rotated and lifted. A lower edge 23 of the plate-shaped element 2 lies at a first height 5. The lower edge 23, in particular the entire plate-shaped element 2, lies at a second height 6 in the second position 4. The second height 6 is higher than the first height 5.

Figure 2:
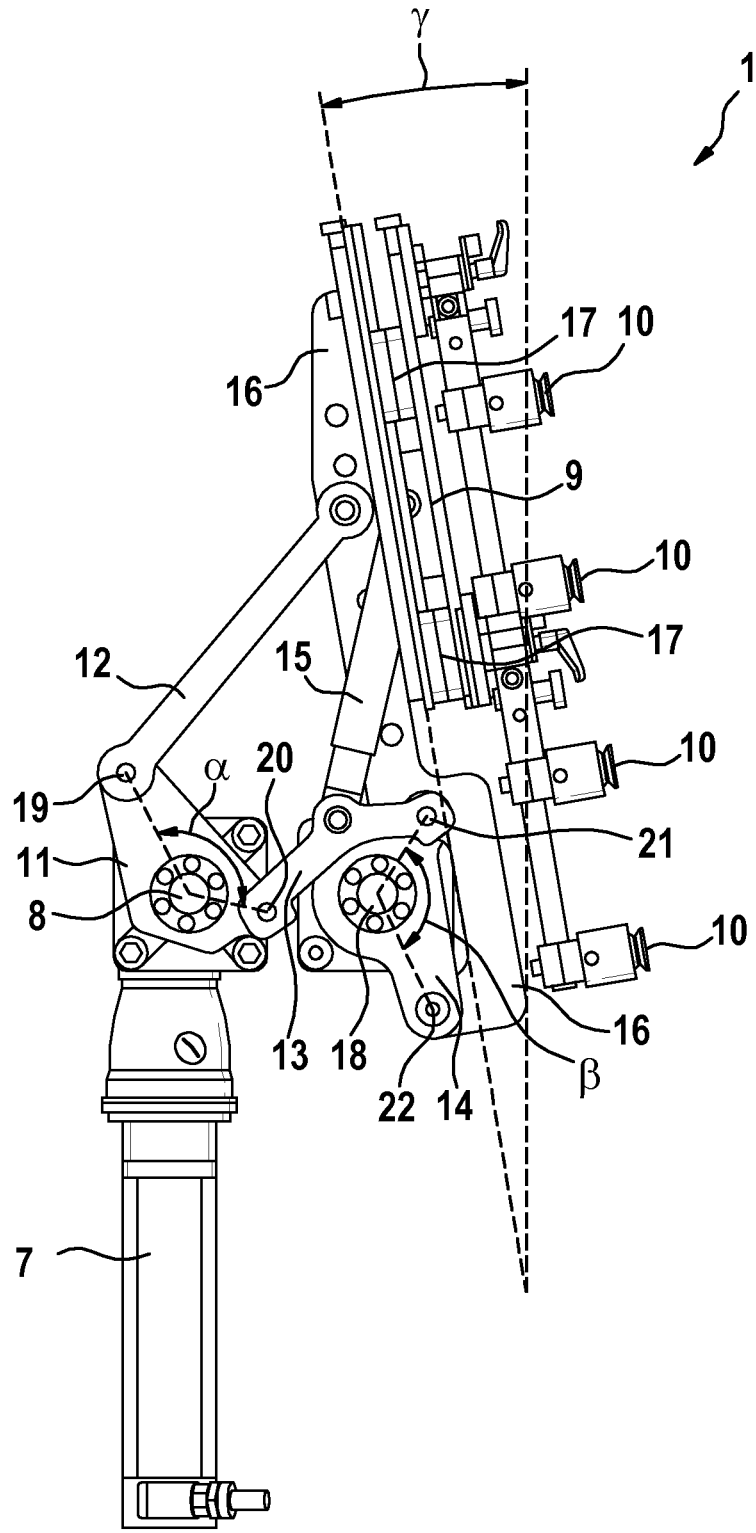
FIG. 2 shows a first state of the inventive device according to the exemplary embodiment.

FIG. 2 shows a device 1 in detail. The device 1 is thereby situated in a position for receiving the plate-shaped elements 2 from the first position 3. An angle γ of approximately 10° is plotted in FIG. 2, at which the plate-shaped elements are inclined towards the device 1 in the first position 3.

The device 1 comprises a drive 7. The drive 7 drives a shaft 8. A carrier device 16 is additionally provided. A holding device 9 is mounted on the carrier device 16. The holding device 9 can thereby be moved linearly with respect to the carrier device 16 by means of a linear guide 17. A plurality of suction apparatuses 10 are disposed on the holding device 9. The suction devices 10 are used to hold the plate-shaped elements 2.

A first lever 11 is arranged fixedly on the shaft 8 so as to rotate with it. The first lever 11 is connected rotatably to a second lever 12 and rotatably to a third lever 13. The second lever 12 is furthermore connected rotatably to the carrier device 16. The third lever 13 is connected rotatably to a fourth lever.

The fourth lever 14 is mounted so that it can be rotated about a fixed point 18. The fixed point 18 is thereby fixed with respect to the shaft 8. In addition, the fourth lever 14 is connected rotatably to the carrier device 16.

The connection between the first lever 11 and the second lever 12 is denoted as the first connecting point 19. The third lever 13 is connected to the first lever 11 at a second connecting point 20. The shaft 8 is disposed between the first connecting point 19 and the second connecting point 20 such that the first connecting point 19 is, for example, lowered and the second connecting point 20 is simultaneously raised when the shaft 8 is rotated.

The third lever 13 is connected at one end to the first lever 11. A third connecting point 21 is located at the other end of the third lever 13 as a connection between the third lever 13 and the fourth lever 14. The fourth lever 14 is connected to the carrier device 16 at a fourth connecting point 22. The fixed point 18 is disposed between the third connecting point 21 and the fourth connecting point 22.

The shaft 8 is disposed between the first and second connecting point 19, 20. The fixed point 18 is disposed between the third and fourth connecting point 21, 22. The arrangement of an element between two connecting points does not mean that said element, for example the shaft 8 or the fixed point 18, has to lie exactly on a line between the two connecting points. Ultimately it is sufficient that a first angle α between an imaginary line from the shaft 8 to the first connecting point 19 and an imaginary line from the shaft 8 to the second connecting point 20 is greater than 90°. It is likewise preferred for a second angle β between an imaginary line from the third connecting point 21 to the fixed point 18 and an imaginary line from the fourth connecting point 22 to the fixed point 18 to be greater than 90°.

In addition, a fifth lever 15 is provided. The fifth lever 15 is connected rotatably to the holding device 9 at one end. The other end of the fifth lever 15 is connected rotatably to the third lever 13.

Figure 3:
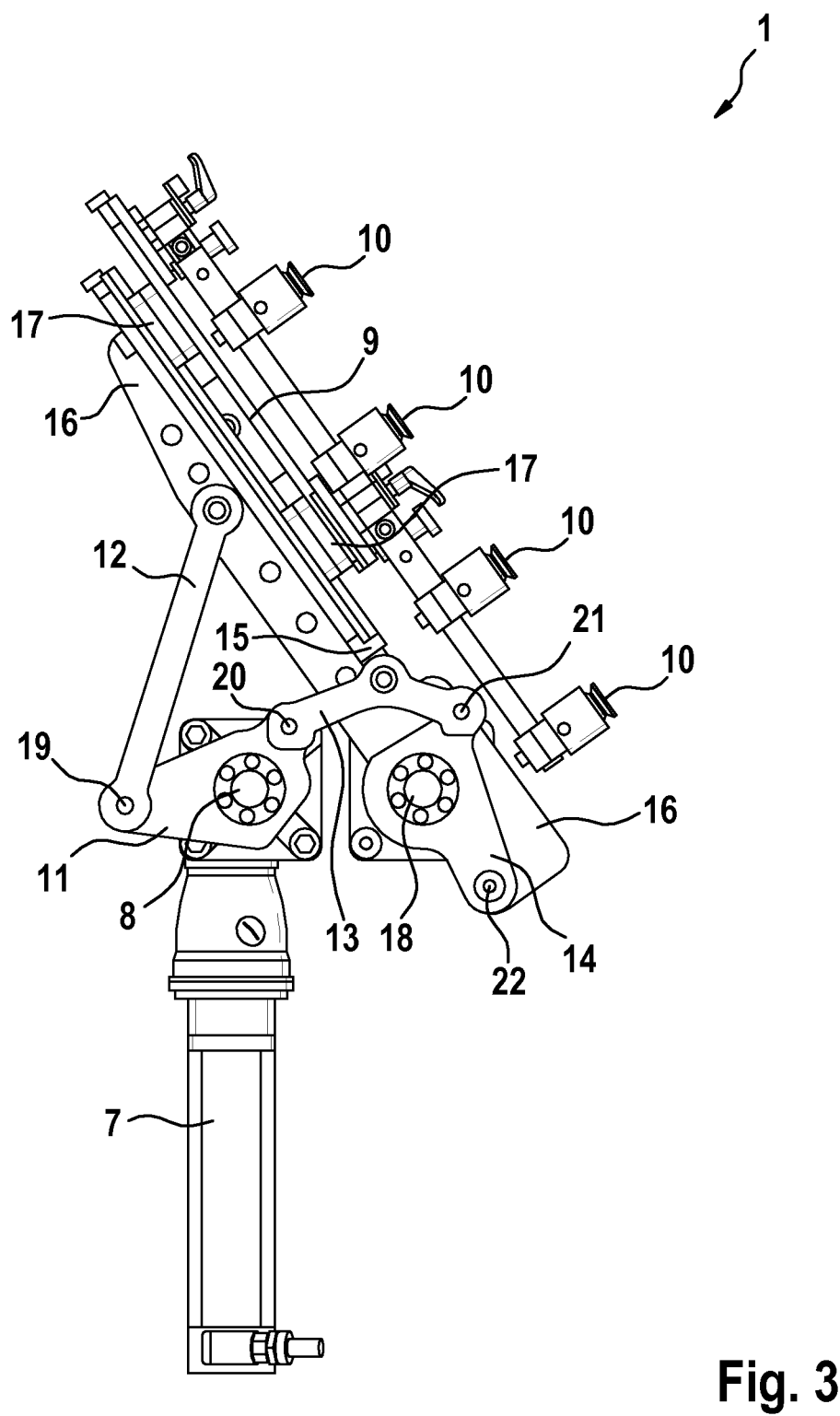
FIG. 3 shows a second state of the inventive device according to the exemplary embodiment.

FIG. 3 shows the device 1 in an intermediate position, between the first position 3 and the second position 4.

Figure 4:
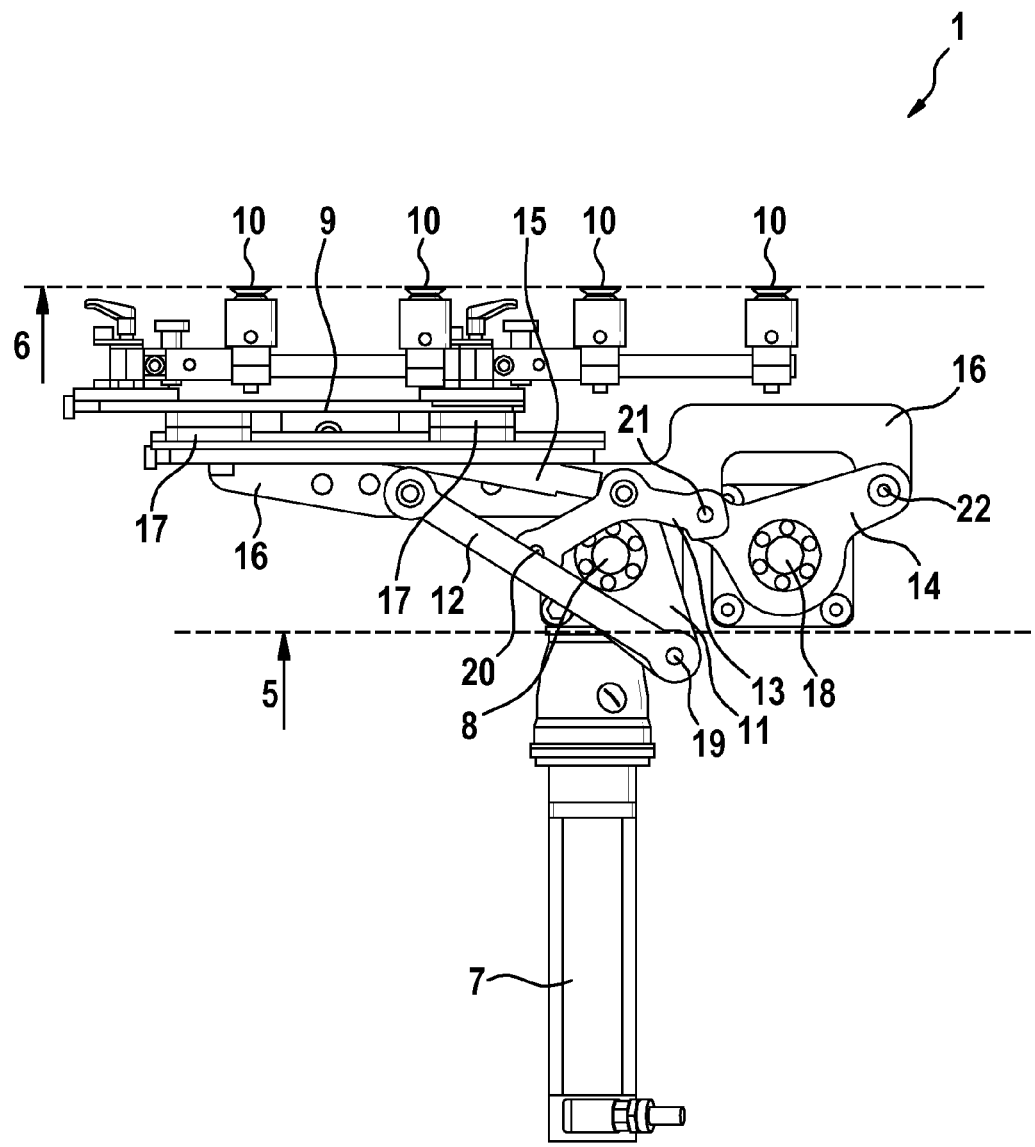
FIG. 4 shows a third state of the inventive device according to the exemplary embodiment.

FIG. 4 shows the device at the second position 4.

Starting from the position in FIG. 2, the shaft 8 is rotated counterclockwise. In so doing, the second lever 12 pulls the upper part of the carrier device 16 to the left. At the same time, the third lever 13 and the fourth lever 14 are rotated clockwise. As a result, the lower part of the carrier device 16 moves to the left. Hence, a movement to the left results for the carrier device 16 and the holding device 9 arranged with the linear guide thereon. It is thereby possible, in the first position 3, for a single plate-shaped element 2 to be lifted away from the remaining plate-shaped elements in the magazine.

By means of a further rotation of the shaft 8 in a counterclockwise direction, the upper part of the carrier device 16 is pulled downwards to the left. In the process, the carrier device 16 tilts in a counterclockwise direction. This is shown by the depiction in FIG. 3. The third lever 13 is simultaneously raised to the left. The holding device 9 is displaced upwards to the left by means of the fifth lever 15. As a result, the lower edge 23 also moves upwards to the left and does not make contact with the plate-shaped elements still standing in the magazine when the carrier device is tilted.

If the driven shaft 8 is rotated further in a counterclockwise direction, the first lever 11 moves further across the extended position of said first lever 11 and the third lever 13. The fourth lever 14 moves counterclockwise. In so doing, the lower part of the carrier device 16 is lifted, whereas the upper part of the carrier device 16 tilts downwards to the left until the horizontal position in accordance with the second position 4 is reached. This is shown in the depiction in FIG. 4.

The embodiment described relates to a seven-membered coupling transmission comprising only one single drive.

In order to simplify the kinematics, the fifth lever 15 and the linear guide 17 can be omitted. In so doing, a five-membered coupling transmission results that has only one drive. As a result, the second height 6 is reduced somewhat, wherein the construction of the device 1 is simplified.

The invention claimed is:

1. A device (1) for removing plate-shaped elements (2), comprising:
   a carrier device (16),
   a holding device (9) which is arranged on the carrier device (16) and is configured to hold the plate-shaped element (2),
   a drive (7) with a driven shaft (8), the driven shaft (8) having a shaft axis,
   a first lever (11) which is arranged fixedly on the shaft (8) so as to rotate with the shaft,
   a second lever (12) which is connected rotatably to the first lever (11) and rotatably to the carrier device (16),
   a fourth lever (14) which is configured to be rotated about a fixed axis (18), which is fixed relative to the shaft axis, wherein the fourth lever (14) is connected rotatably to the carrier device (16), and
a third lever (13) which is connected rotatably to the first lever (11) and rotatably to the fourth lever (14).

2. The device according to claim 1, characterized in that the holding device (9) comprises at least one of a gripper and a suction apparatus (10) for holding the plate-shaped element (2).

3. The device according to claim 1, characterized in that the second lever (12) is connected to the first lever (11) at a first connecting point (19), and the third lever (13) is connected to the first lever (11) at a second connecting point (20), wherein the shaft (8) is disposed between the first connecting point and the second connecting point (19, 20).

4. The device according to claim 3, characterized in that the third lever (13) is connected to the fourth lever (14) at a third connecting point (21), and the carrier device (16) is connected to the fourth lever (14) at a fourth connecting point (22), wherein the fixed axis (18) is disposed between the third and fourth connecting point (21, 22).

5. The device according to claim 4, characterized by a fifth lever (15) which is connected rotatably to the third lever (13) and rotatably to the holding device (9), wherein the holding device (9) is guided in a linearly movable manner on the carrier device (16).

6. The device according to claim 5, characterized in that the fifth lever (15) is connected to the third lever (13) between the second and third connecting point (20, 21).

7. The device according to claim 1, characterized in that the shaft axis and rotational axes of all of the levers (11-15) are aligned parallel to one another.

8. The device according to claim 1, characterized in that the levers (11-15) of the device (1) are configured to remove the plate-shaped element (2) from a first position (3) and to lay said element down in a second position (4), wherein the plate-shaped element (2) stands vertically in the first position (3) with a deviation of ±20°, wherein the plate-shaped element (2) lies horizontally in the second position (4) with a deviation of ±20°, and wherein the position of the plate-shaped element (2) is higher in the second position (4) than a lower edge (23) of the plate-shaped element (2) in the first position (3).

9. The device according to claim 1, characterized in that the shaft axis and rotational axes of all of the levers (11-15) are aligned horizontally.

10. The device according to claim 1, characterized in that the third lever (13) is connected to the fourth lever (14) at a third connecting point (21), and the carrier device (16) is connected to the fourth lever (14) at a fourth connecting point (22), wherein the fixed axis (18) is disposed between the third and fourth connecting point (21, 22).

11. The device according to claim 1, characterized by a fifth lever (15) which is connected rotatably to the third lever (13) and rotatably to the holding device (9), wherein the holding device (9) is guided in a linearly movable manner on the carrier device (16).

12. The device according to claim 1, characterized in that the holding device (9) is fixedly connected to the carrier device (16).

* * * * *